(12) United States Patent
Cui et al.

(10) Patent No.: US 12,137,362 B2
(45) Date of Patent: Nov. 5, 2024

(54) NETWORK OPERATIONS FOR INDEPENDENT MEASUREMENT GAP CONFIGURATION

(71) Applicant: Apple Inc., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Manasa Raghavan, Sunnyvale, CA (US); Wenshu Zhang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 17/593,456

(22) PCT Filed: Aug. 4, 2020

(86) PCT No.: PCT/CN2020/106902
§ 371 (c)(1),
(2) Date: Sep. 19, 2021

(87) PCT Pub. No.: WO2022/027253
PCT Pub. Date: Feb. 10, 2022

(65) Prior Publication Data
US 2022/0322121 A1    Oct. 6, 2022

(51) Int. Cl.
*H04W 24/10*    (2009.01)
*G06N 20/00*    (2019.01)
(Continued)

(52) U.S. Cl.
CPC ....... *H04W 24/10* (2013.01); *H04W 74/0833* (2013.01); *H04W 76/15* (2018.02);
(Continued)

(58) Field of Classification Search
CPC . H04W 24/10; H04W 74/0833; H04W 76/15; H04W 16/14; H04W 36/0069; H04W 36/0088
See application file for complete search history.

(56) References Cited

U.S. PATENT DOCUMENTS

2018/0034598 A1   2/2018  Yiu et al.
2019/0021017 A1*  1/2019  Nagaraja ............... H04W 72/51
(Continued)

FOREIGN PATENT DOCUMENTS

CN    104602267    5/2015
CN    106559826    4/2017
(Continued)

OTHER PUBLICATIONS

CMCC, "Measurement Gap Configuration for Remaining DC Scenarios"; 3GPP TSG-RAN WG2 Meeting #103; R2-1811512; Aug. 24, 2018; 5 sheets.
(Continued)

*Primary Examiner* — Faruk Hamza
*Assistant Examiner* — Aixa A Guadalupe Cruz
(74) *Attorney, Agent, or Firm* — Fay Kaplun & Marcin, LLP

(57) ABSTRACT

A network cell is connected to a user equipment (UE) that supports an independent measurement gap configuration. The cell establishes a connection to the UE, receives an indication that the UE supports an independent measurement gap configuration for new radio in an unlicensed spectrum (NR-U) and transmits measurement gap configuration information to the UE, wherein the UE configures a measurement gap pattern based on the measurement gap configuration information.

17 Claims, 4 Drawing Sheets

Table 200

| Scenario # | Description |
|---|---|
| A | Carrier aggregation with one or more 5G NR cells and one or more 5G NR-U cells |
| B | Dual-connectivity with one or more LTE cells and one or more 5G NR-U cells |
| C | Standalone 5G NR-U |
| D | Standalone 5G NR-U with an uplink in the licensed spectrum |
| E | Dual-connectivity with one or more 5G NR cells and one or more 5G NR-U cells |

(51) Int. Cl.
  *H04W 48/16* (2009.01)
  *H04W 48/18* (2009.01)
  *H04W 74/0833* (2024.01)
  *H04W 76/15* (2018.01)

(52) U.S. Cl.
  CPC ............ *G06N 20/00* (2019.01); *H04W 48/16* (2013.01); *H04W 48/18* (2013.01)

(56) References Cited

U.S. PATENT DOCUMENTS

| | | |
|---|---|---|
| 2019/0150015 A1 | 5/2019 | Wei et al. |
| 2019/0313410 A1* | 10/2019 | Yang ................ H04W 72/0453 |
| 2019/0373668 A1 | 12/2019 | Wang et al. |
| 2020/0162932 A1 | 5/2020 | Futaki |
| 2021/0226750 A1* | 7/2021 | Cheng ............... H04W 36/0088 |
| 2023/0134401 A1* | 5/2023 | Hu .................... H04W 36/0088 370/252 |

FOREIGN PATENT DOCUMENTS

| | | |
|---|---|---|
| CN | 107431957 | 12/2017 |
| CN | 107637120 | 1/2018 |
| CN | 110603840 | 12/2019 |
| CN | 111247852 | 6/2020 |

OTHER PUBLICATIONS

Ericsson, "On per-NR U measurement gap"; 3GPP TSG-RAN WG4 #93; R4-1914657; Nov. 18, 2019; 3 sheets.

Ericsson, "On UE interruptions for NR-U"; 3GPP TSG-RAN WG4 Meeting #92; R4-1909568; Aug. 30, 2019; 5 sheets.

Ericsson, "Independent gap pattern for NR-U measurements"; 3GPP TSG-RAN WG4 Meeting #92bis; R4-1912048; Oct. 18, 2019; 2 sheets.

ZTE Corporation et al., "Discussion on the configuration of measurement gap"; 3GPP TSG-RAN WG2 Meeting #100; R2-1712602; Dec. 1, 2017; 11 sheets.

* cited by examiner

| Scenario # | Description |
|---|---|
| A | Carrier aggregation with one or more 5G NR cells and one or more 5G NR-U cells |
| B | Dual-connectivity with one or more LTE cells and one or more 5G NR-U cells |
| C | Standalone 5G NR-U |
| D | Standalone 5G NR-U with an uplink in the licensed spectrum |
| E | Dual-connectivity with one or more 5G NR cells and one or more 5G NR-U cells |

Table 200

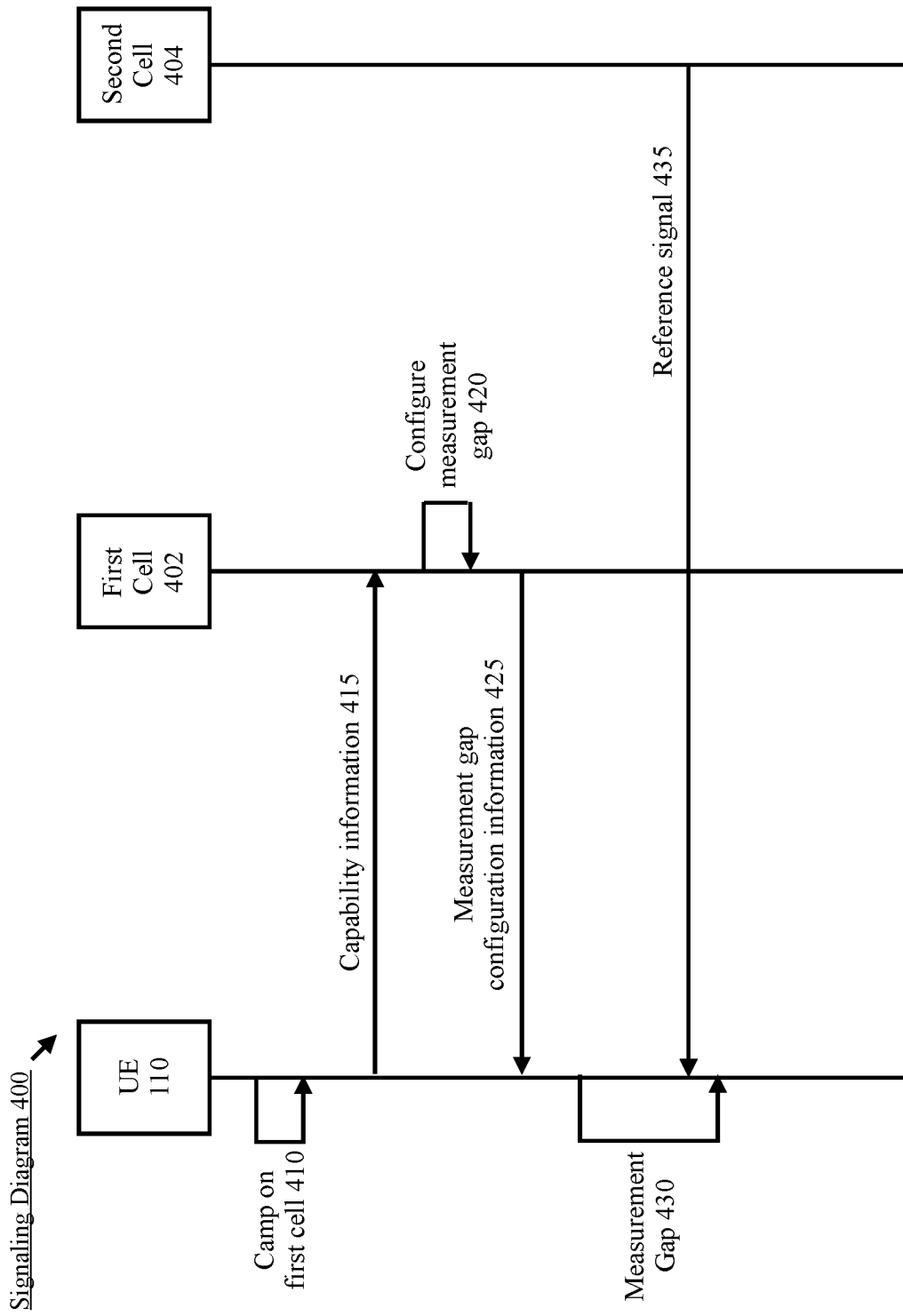

NETWORK OPERATIONS FOR INDEPENDENT MEASUREMENT GAP CONFIGURATION

BACKGROUND

A user equipment (UE) may camp on a cell of a corresponding network to establish a network connection. When camped, the UE may be configured with a measurement gap pattern that includes a measurement gap and a measurement gap repetition period (MGRP). The measurement gap may represent a time window during which the UE may collect measurement data corresponding to cells other than currently configured serving cells. The MGRP may represent the time duration between two consecutive measurement gaps.

Fifth generation (5G) new radio (NR) coverage may be extended to the unlicensed spectrum (5G NR-U). A 5G NR-U capable UE may be configured with one or more measurement gap patterns. In some scenarios, a measurement gap may be configured for multiple different types of measurements, e.g., inter-frequency, inter-radio access technology (inter-RAT), licensed spectrum, unlicensed spectrum, etc. For example, the UE may be configured with a measurement gap that is to be used for both 5G NR cells and 5G NR-U cells. In other scenarios, a measurement gap may be configured for a particular type of measurement. For example, the UE may be configured with an independent measurement gap for 5G NR-U cells.

SUMMARY

Some exemplary aspects are related to a method performed by a cell of a network. The method includes establishing a connection to a user equipment (UE), receiving an indication that the UE supports an independent measurement gap configuration for new radio in an unlicensed spectrum (NR-U) and transmitting measurement gap configuration information to the UE, wherein the UE configures a measurement gap pattern based on the measurement gap configuration information.

Other exemplary aspects are related to a cell having a transceiver and a processor. The transceiver is configured to communicate with a user equipment (UE). The processor is configured to perform operations that include establishing a connection to the UE, receiving an indication that the UE supports an independent measurement gap configuration for new radio in an unlicensed spectrum (NR-U) and transmitting measurement gap configuration information to the UE, wherein the UE configures a measurement gap pattern based on the measurement gap configuration information.

Still further exemplary aspects are related to an integrated circuit for use in a cell. Then integrated circuit includes circuitry configured to establish a connection to a user equipment (UE), circuitry configured to receive an indication that the UE supports an independent measurement gap configuration for new radio in the unlicensed spectrum (NR-U) and circuitry configured to transmit a measurement gap configuration information to the UE, wherein the UE configures a measurement gap pattern based on the measurement gap configuration information.

BRIEF DESCRIPTION OF THE DRAWINGS

FIG. 4 shows a signaling diagram for independent measurement gap configuration for 5G NR-U according to various exemplary embodiments.

DETAILED DESCRIPTION

Figure 1:
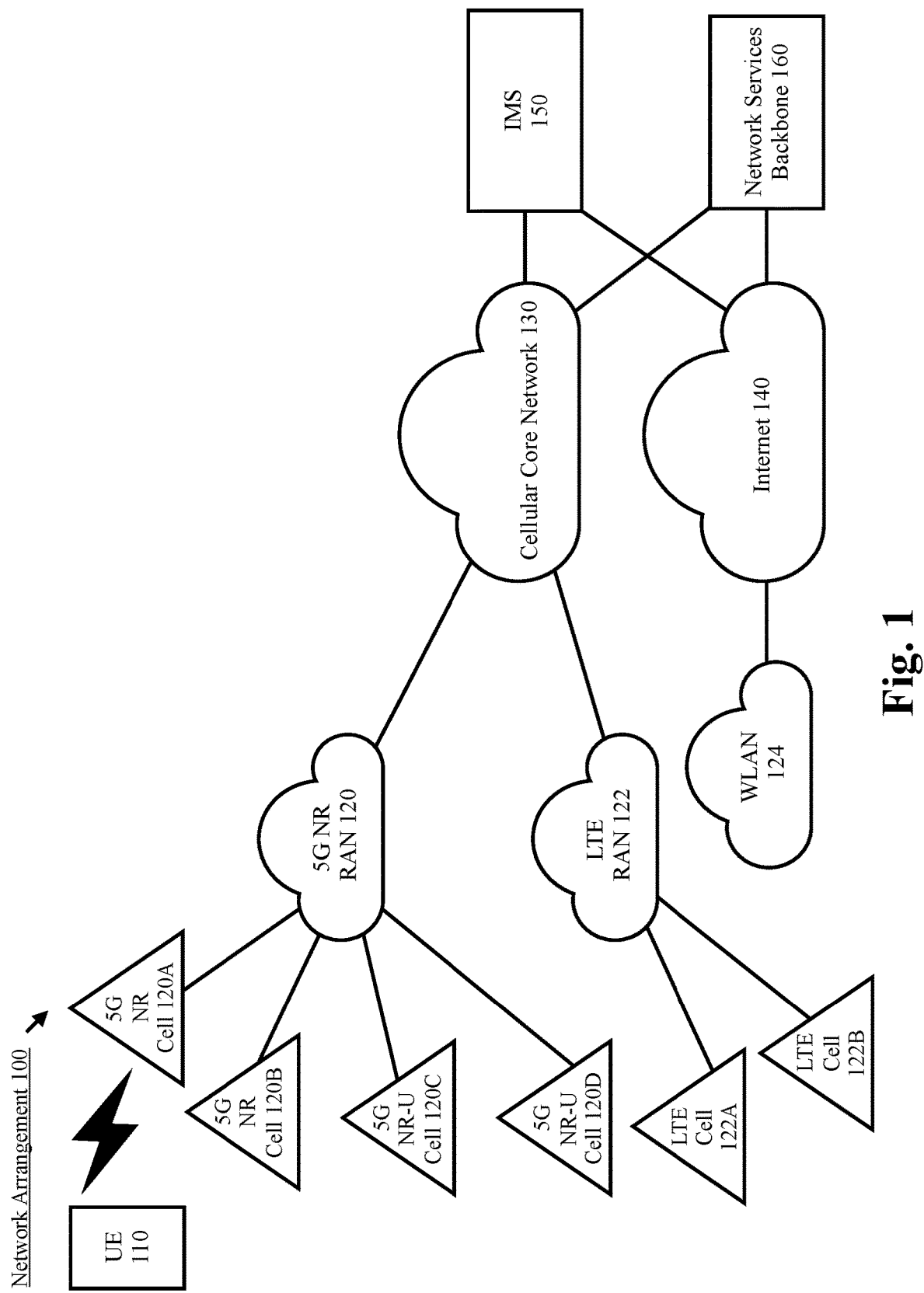
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing an independent measurement gap configuration for a fifth generation (5G) new radio (NR) in the unlicensed spectrum (NR-U) capable user equipment (UE). The exemplary embodiments provide the network and UE with mechanisms to handle situations related to measurement gaps for 5G NR-U.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

When camped on a cell of a network, the UE may be configured with a measurement gap pattern that includes a measurement gap and a measurement gap repetition period (MGRP). Those skilled in the art will understand that the term "measurement gap" generally refers to a time duration during which the UE may collect measurement data corresponding to cells other than a currently configured serving cell. For example, while camped on a first cell of a first network, the UE may be configured with a measurement gap during which the UE may scan various frequencies for signals broadcast by other cells, e.g., a second cell of the first network, a first cell of a second network, etc. The UE may collect measurement data based on the signals received during the measurement gap. The measurement data collected by the UE may then be used by the UE and/or the network for a variety of different purposes including, but not limited to, cell selection, cell reselection, handover, carrier aggregation, dual connectivity, radio resource management, etc.

Those of skilled in the art will also understand that the term "MGRP" may generally refer to a time duration between two consecutive measurement gaps. For example, consider a scenario in which a measurement gap pattern is configured with a measurement gap length of (Y) seconds and a MGRP of (X) seconds. Initially, a first measurement gap is triggered. The UE may then tune its transceiver to one or more frequencies scanning for signals broadcast by one of more different types of target cells for (Y) seconds. After the expiration of the measurement gap, the UE may return tune back to its serving cell. A second measurement gap may be triggered (X) seconds after the first measurement gap. The UE may once again tune its transceiver to one or more frequencies scanning for signals broadcast by one of more different types of target cells for (Y) seconds. The above example is not intended to limit the exemplary embodiments in any way. Instead, the above example is merely provided as a general example of the relationship between a measurement gap and a MGRP.

The UE may be capable of supporting multiple concurrent independent measurement gap patterns. In some scenarios, a measurement gap may be configured for multiple different types of measurements, e.g., inter-frequency, inter-radio access technology (inter-RAT), licensed spectrum, unlicensed spectrum, etc. For example, the UE may be configured with a measurement gap that is to be used for both 5G NR cells and 5G NR-U cells. In other scenarios, a measurement gap may be configured for a particular type of measurement. For example, the UE may be configured with an independent measurement gap for 5G NR-U cells. The exemplary embodiments provide the network and UE with mechanisms to handle situations related to measurement gaps configured for 5G NR-U.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120, a Long Term Evolution (LTE) RAN 122 and a WLAN 124. However, it should be understood that the UE 110 may also communicate with other types of networks (e.g. 5G cloud RAN, legacy cellular network, etc.) and the UE 110 may also communicate with networks over a wired connection. With regard to the exemplary embodiments, the UE 110 may establish a connection with the 5G NR RAN 120, the LTE RAN 122 and/or the WLAN 124. Therefore, the UE 110 may have a 5G NR chipset to communicate with the NR RAN 120, an LTE chipset to communicate with the LTE-RAN 122 and an ISM chipset to communicate with the WLAN 124.

The 5G NR RAN 120 and the LTE-RAN 122 may be portions of a cellular network that may be deployed by a network carrier (e.g., Verizon, AT&T, Sprint, T-Mobile, etc.). The RANs 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

In network arrangement 100, the 5G NR RAN 120 includes a first 5G NR cell 120A, a second 5G NR cell 120B, a first 5G NR-U cell 120C and a second 5G NR-U cell 120D. Further, the LTE-RAN 120 includes a first LTE cell 122A and a second LTE cell 122B. However, an actual network arrangement may include any number of cells being deployed by any number of RANs. Thus, the example of two 5G NR cells 120A, 120B, two 5G NR-U cells 120C, 120D and two LTE cells 122A, 122B is merely provided for illustrative purposes.

The cells (e.g., 120A-120D, 122A, 122B) may include one or more communication interfaces to exchange data and/or information with UEs, the corresponding RAN, the cellular core network 130, the internet 140, etc. Further, the cells may include a processor configured to perform various operations. For example, the processor of the cell may be configured to perform operations related to configuring a measurement gap for a currently camped UE and transmitting signals that may be used by a UE to derive measurement data during a configured measurement gap. However, reference to a processor is merely for illustrative purposes. The operations of the cell may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Figure 2:
FIG. 2 shows a table that describes various example scenarios for the deployment of a system that includes 5G New Radio in unlicensed spectrum (5G NR-U).

As will be described in more detail below with regard to FIG. 2, the exemplary embodiments relate to scenarios that may include carrier aggregation (CA) and/or dual connectivity (DC). Thus, in some embodiments, the UE 110 may be connected to both the 5G NR-RAN 120 and the LTE-RAN 122. However, reference to separate 5G NR-RAN 120 and LTE-RAN 122 is merely provided for illustrative purposes. An actual network arrangement may include a radio access network that includes architecture that is capable of providing both 5G NR RAT and LTE RAT services. For example, a next-generation radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve DC by establishing a connection to at least one cell corresponding to the 5G NR-RAN 120 and at least one cell corresponding to the LTE-RAN 122. In another exemplary configuration, the UE 110 may achieve DC by establishing a connection to at least two cells corresponding to the NG-RAN or other type of similar RAN. Further, the 5G NR-RAN 120 is shown as supporting both 5G NR cells and 5G NR-U cells. While these cells are shown as being connected to the same RAN, this is merely for illustrative purposes. In an actual network arrangement, 5G NR cells and 5G NR-U cells may each correspond to a different RAN. Accordingly, the example of the 5G NR-RAN 120 and the LTE-RAN 122 is merely provided for illustrative purposes.

Returning to the exemplary network arrangement 100, the UE 110 may connect to the 5G NR-RAN 120 via at least one of the cells 120A-120D. The UE 110 may connect to the LTE-RAN 122 via at least one of the cells 122A-122B. Those skilled in the art will understand that any association procedure may be performed for the UE 110 to connect to the 5G NR-RAN 120 or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cells 120A-120D). Similarly, for access to LTE services, the UE 110 may associate with cell 122A. However, as mentioned above, reference to the 5G NR-RAN 120 and the LTE-RAN 122 is merely for illustrative purposes and any appropriate type of RAN may be used.

In addition to the networks 120-124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

As mentioned above, the exemplary embodiments provide the network and UE with mechanisms to handle situations related to measurement gaps for 5G NR-U. FIG. 2 shows a table 200 that describes various example scenarios for the deployment of a system that includes 5G NR-U. The table 200 will be described with regard to the network arrangement 100 of FIG. 1. Throughout this description, some of the exemplary embodiments may reference the example scenarios of the table 200.

Scenario A of the table 200 relates to CA with one or more 5G NR cells and one or more 5G NR-U cells. CA may include a primary component carrier (PCC) and at least one secondary component carrier (SCC) being used to facilitate communication with the network. The PCC may be used, in part, for control information such as scheduling requests, uplink grants, downlink grants, etc. CA functionality enables the network to use the PCC and at least one SCC to combine bandwidths to exchange data with the UE 110. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE 110, additional SCCs may be incorporated. For example, there may be CC combinations that include, but are not limited to, two carriers, five carriers, ten carriers, twelve carriers, sixteen carriers, twenty carriers, twenty-five carriers, thirty-two carriers, sixty-four carriers, etc.

To provide an example of scenario A within the context of the network arrangement 100, the UE 110 may be configured with a PCC to communicate with a primary cell (PCell) that operates in the licensed spectrum (e.g., 5G NR cell 120A or 5G NR cell 120B) and a SCC to communicate with a secondary cell (SCell) that operates in the unlicensed spectrum (e.g., 5G NR-U cell 122A or 5G NR-U cell 122B). In this example, the 5G NR-U cell operating as the SCell may be used for both uplink and downlink communications or only downlink communications. This example is not intended to limit the scope of the exemplary embodiments and instead is used to demonstrate a general example in which 5G NR-U and 5G NR may be used to provide CA.

Scenario B of the table 200 relates to DC with one or more LTE cells and one or more 5G NR-U cells. Throughout this description, DC may generally refer to a UE 110 that is configured to transmit and receive on a plurality of CCs corresponding to cells associated with different RATs (e.g., 5G NR, 5G NR-U, LTE, etc.). The UE may achieve DC via one or more cells of a master cell group (MCG) and one or more cells of a secondary cell group (SCG). Like CA, DC may include various different types of CC combinations.

To provide an example of scenario B within the context of the network arrangement 100, the UE 110 may be configured with an MCG that includes one or more LTE cells (e.g., LTE cell 122A, 122B) and a SCG that includes one or more 5G NR-U cells (e.g., 5G NR-U cells 120C, 120D). From a protocol stack perspective, in some embodiments, the UE 110 may have a control plane and a user plane with the LTE-RAN 122 via the MCG and a control plane and a user plane with the 5G NR-RAN 120 via the SCG. In other embodiments, the UE 110 have a control plane with the LTE-RAN 122 via the MCG and a user plane with the 5G NR-RAN 120 via the SCG (or vice versa). This example is not intended to limit the scope of the exemplary embodiments and instead is used to demonstrate a general example in which LTE and 5G NR-U may be used to provide DC.

Scenario C of the table 200 relates to standalone 5G NR-U. In this type of scenario, the UE 110 may access network services from 5G NR-U cells (e.g., 5G NR-U cells 120C, 120D) without the use of any licensed carrier. The UE 110 may communicate with the 5G NR-U cells in both the uplink and the downlink. Standalone 5G NR-U may also encompass a CA scenario that includes multiple 5G NR-U cells.

Scenario D of the table 200 relates to standalone 5G NR-U with an uplink in the licensed spectrum. In this type of scenario, the UE 110 may access network services from 5G NR-U cells (e.g., 5G NR-U cells 120C, 120D). The UE 110 may also be configured to transmit information and/or data to the network using an uplink to a cell that operates in the licensed spectrum (e.g., 5G NR cell 120A, 5G NR cell 120B, LTE cell 122A, LTE cell 122B). The scope of the exemplary scenario D may overlap with the scope of exemplary scenario A and scenario B.

Scenario E of the table 200 relates to DC with one or more 5G NR cells and one or more 5G NR-U cells. For example, the UE 110 may be configured with an MCG that includes one or more 5G NR cells (e.g., 5G NR cells 120A, 120B) and a SCG that includes one or more 5G NR-U cells (e.g., 5G NR-U cells 120C, 120d). From a protocol stack perspective, in some embodiments, the UE 110 may have a control plane and a user plane via the MCG and a control plane and a user plane with via SCG. In other embodiments, the UE 110 have a control plane with the via the MCG and a user plane via the SCG (or vice versa). This example is not intended to limit the scope of the exemplary embodiments and instead is used to demonstrate a general example in which 5G NR and 5G NR-U may be used to provide DC.

Figure 3:
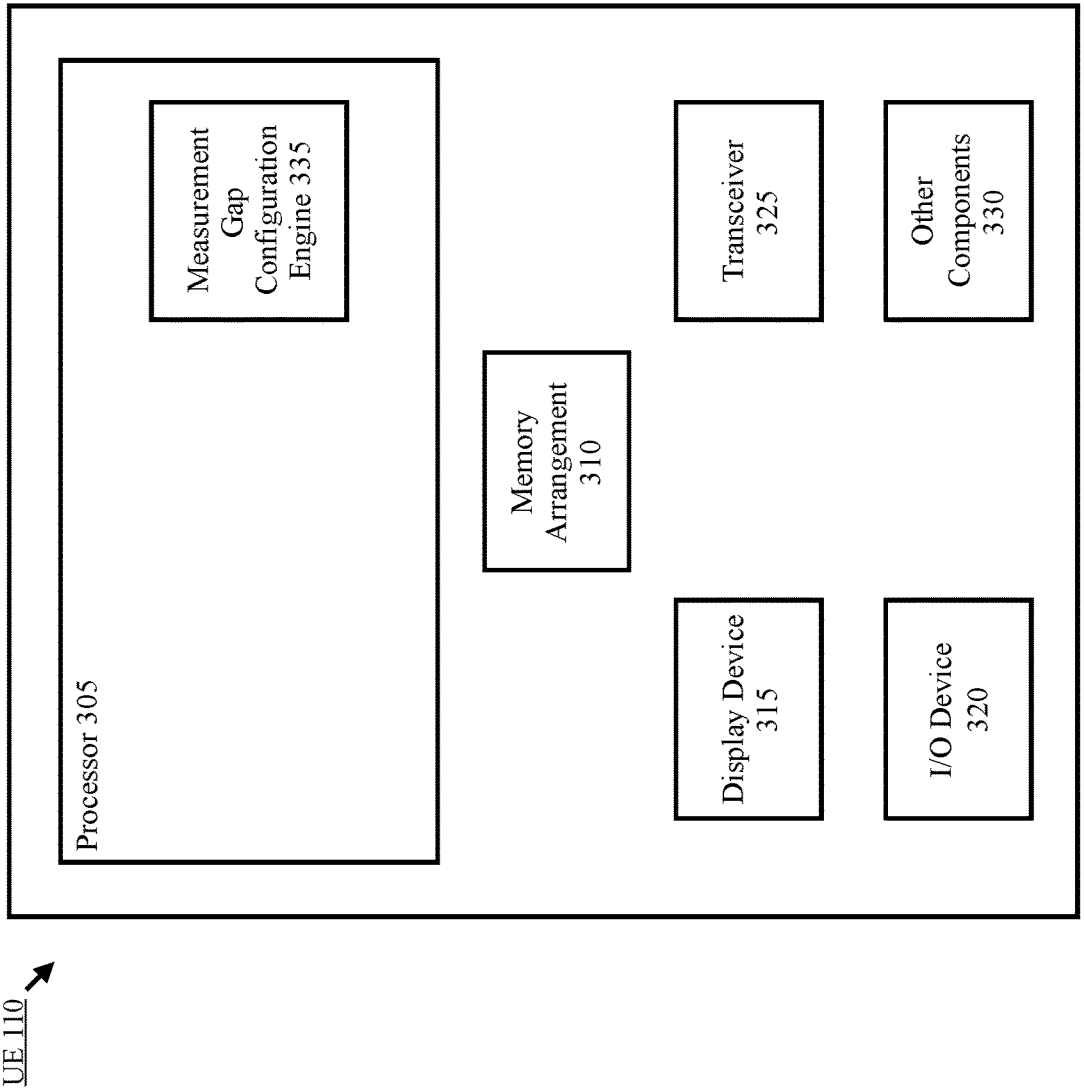
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may represent any electronic device and may include a processor 305, a memory arrangement 310, a display device 315, an input/output (I/O) device 320, a transceiver 325 and other components 330. The other components 330 may include, for example, an audio input device, an audio output device, a battery that provides a limited power supply, a data acquisition device, ports to electrically connect the UE 110 to other electronic devices, etc.

The processor 305 may be configured to execute a plurality of engines of the UE 110. For example, the engines may include a measurement gap configuration engine 335. The measurement gap configuration engine 335 may perform operations associated with configuring a measurement gap and collecting measurement data in accordance with a corresponding measurement gap pattern.

The above referenced engine being an application (e.g., a program) executed by the processor 305 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, the LTE-RAN 122, the WLAN 124, etc. Accordingly, the transceiver 325 may operate on a variety of different frequencies or channels (e.g., set of consecutive frequencies).

The UE 110 may be equipped with multiple radio frequency (RF) chains. For example, the transceiver 325 may include one or more RF chains that may be used for receiving and/or transmitting an over the air (OTA) signal. In some embodiments, to facilitate concurrent independent measurement gap patterns, a first RF chain may be used for operations corresponding to a first measurement gap pattern and a second RF chain may be used for operations corresponding to a second measurement gap pattern. Those skilled in the art will understand the type of hardware, software and/or firmware components that may be used to operate an RF chain. The exemplary embodiments may apply to an RF chain that is implemented using any appropriate set of components. In addition, the use of one or two RF chains is only exemplary, the UE 110 may have any number of RF chains.

FIG. 4 shows a signaling diagram 400 for independent measurement gap configuration for 5G NR-U according to various exemplary embodiments. The signaling diagram 400 will be described with regard to the network arrangement 100 of FIG. 1 and the UE 110 of FIG. 2.

The signaling diagram 400 includes the UE 110, a first cell 402 and a second cell 404. In this example, the first cell 402 represents a currently camped cell and the second cell 404 represents any type of neighbor cell, e.g., inter-frequency, inter-RAT, licensed access, unlicensed access, etc. The signaling diagram 400 provides a general overview of the type of signaling that may occur before and after the configuration of a measurement gap. However, throughout the description of the signaling diagram 400, specific examples may reference the scenarios of the table 200. Accordingly, in some examples, the first cell 402 and/or the second cell 404 may be characterized by specific properties.

In 410, the UE 110 is camped on the first cell 402. To provide some examples, within the context of scenarios A and E of the table 200, the first cell 402 may be an 5G NR cell (e.g., 5G NR cell 120A, 120B). Within the context of scenario B of the table 200, the first cell 402 may be an LTE cell (e.g., LTE cells, 122A, 122B). Within the context of scenarios A-E of the table 200, the first cell 402 may be a 5G NR-U cell (e.g., 5G NR-U cells 120C, 120D). Thus, the first cell 402 may be a 5G NR-U cell or a cell of a different RAT. However, the exemplary embodiments are not limited to the first cell 402 being any particular type of cell and may apply to the UE 110 being camped on any appropriate type of cell in 410.

In 415, the UE 110 may transmit an indication of one or more capabilities related to an independent measurement gap for 5G NR-U. For example, capability information may be transmitted to the first cell 402 in response to a capability query during radio resource control (RRC) signaling. However, this example is merely provided for illustrative purposes, the exemplary embodiments may transmit this indication at any appropriate time using any appropriate mechanism. Further, as will be described in more detail below, the network may configure the UE 110 with one or more measurement gaps based on the indication transmitted in 415.

In some embodiments, the capability information may include an information element (IE) that may be used to indicate one or more UE 110 capabilities related to an independent measurement gap for 5G NR-U. In this example, this IE (or field) may be referred to as "independentGapConfigCCA" where CCA stands for clear channel assessment. The independentGapConfigCCA IE may indicate whether the UE 110 supports two independent measurement gaps, one independent measurement gap for licensed band cell measurements and one independent measurement gap for NR-U cell measurements. The independentGapConfigCCA IE may also indicate whether the UE 110 supports licensed band cell measurements without gaps when the UE 110 is configured with only 5G NR-U serving cells. The independentGapConfigCCA IE may further indicate whether the UE 110 supports the 5G NR-U cell measurements without gaps when the UE 10 is configured with only licensed band serving cells. Thus, using one or more bits, the UE 110 may implicitly indicate to the network one or more capabilities related to an independent measurement gap for 5G NR-U.

As mentioned above, the UE 110 may be equipped with multiple RF chains. The RF chains may enable the UE 110 to support two or more independent measurement gaps and gapless measurements. For example, a first RF chain may be used for collecting measurement data in accordance with one of the independent measurement gap configurations and a second RF chain may be used for collecting measurement data in accordance with the other independent measurement gap configuration. Further, since one RF chain may be used for licensed band cells and one RF chain may be used for 5G NR-U cells, the UE 110 may support measurements without gaps. For example, when the UE 110 is configured with only 5G NR-U serving cells, the UE 110 may implement measurement gaps to measure other 5G NR-U cells. However, since the UE 110 is not configured with any licensed band serving cells, there is no licensed band serving cell to tune away from during a measurement gap. Accordingly, the UE 110 may support measurements without gaps for licensed band cells when configured with only 5G NR-U serving cells or vice versa.

For CA and DC, the UE 110 may be configured to advertise supported band combinations. In some embodiments, the UE 110 may include an indication that is specific to one or more particular band combinations. Thus, the indication in 415 may represent one or more indications, each specific to one or more particular band combinations.

In 420, the network configures one or more measurement gaps for the UE 110. Although this operation is shown as being specific to the first cell 402 in the signaling diagram 400, this operation may be performed by any appropriate set of one or more network components (e.g., the first cell 402, the corresponding RAN, the core network 130, a network function, a master node, a secondary node, a SCell, a PSCell, etc.).

If the UE 110 indicates that the UE 110 does not support an independent measurement gap for 5G NR-U in 415, the network may configure a legacy measurement gap that may be used for both licensed band cell measurements and 5G NR-U cell measurements. Alternatively, if the UE 110 indicates that the UE 110 is capable of supporting an independent measurement gap for 5G NR-U in 415, the network may configure i) a legacy measurement gap that may be used for both licensed band cell measurements and 5G NR-U cell measurements or ii) a legacy measurement gap that may be used for licensed band cell measurements and an independent measurement gap for 5G NR-U cell measurements.

Within the context of scenarios B and E of the table 200, in some embodiments, a master node may configure one or more measurement gaps for both licensed band cell measurement and 5G NR-U cell measurement. In other embodiments, the master node may configure a measurement gap for licensed band cell measurement and a secondary node may configure a measurement gap for 5G NR-U cell measurement.

In 425, the first cell 402 may transmit measurement gap configuration information to the UE 110. Like the indication transmitted in 415, the measurement gap configuration information may be transmitted during RRC signaling. However, this example is merely provided for illustrative purposes, the exemplary embodiments may transmit this indication at any appropriate time using any appropriate mechanism.

The measurement gap configuration information may include information such as, but not limited to, a measurement gap length, a MGRP, a timing offset, a gap pattern ID, subframe information, relevant CC, relevant target cells, etc. If the measurement gap configuration information is for both licensed band cell measurement and 5G NR-U cell measurement, the measurement gap configuration information will include an explicit or implicit indication. Similarly, if the measurement gap configuration information is for licensed band cell measurement only or 5G NR-U cell measurement only, the measurement gap configuration information will include an explicit or implicit indication. Based on the measurement gap configuration information, the UE 110 may be able to determine the timing of the assigned measurement gap pattern. At this time, both the UE 110 and the network are synchronized with regard to the measurement gap pattern, e.g., the UE 110 knows when to monitor for signals that may be used to derive measurement data for cells other than the cell 402.

In 430, a measurement gap is scheduled to occur. In 435, the second cell 404 transmits a signal during the measurement gap in 430. For example, in 435, the second cell 404 may transmit a reference signal or any other appropriate signal. In response, the UE 110 may derive measurement data such as, reference signal received power (RSRP), reference signal received quality (RSRQ), etc. As mentioned above, the measurement data collected by the UE 110 may then be used by the UE and/or the network for a variety of different purposes including, but not limited to, cell selection, cell reselection, handover, carrier aggregation, dual connectivity, radio resource management, etc. Thus, the measurement data may trigger subsequent operations at the UE 110 side and/or may be transmitted to the network for subsequent processing. However, the type of measurement data collected and the type of behavior that may be triggered by the measurement data is beyond the scope of the exemplary embodiments. Instead, the exemplary embodiments are directed towards UE 110 and network behavior with regard to configuring and implementing a measurement gap that may be used for 5G NR-U. Specific examples of UE 110 and network behavior during the measurement gap will be described in more detail below.

Initially, consider a scenario in which the UE 110 is currently configured with only one or more licensed band serving cells. For example, the cell 402 may be one of the 5G NR cells 120A, 120B, or the LTE cells 122A, 122B. If the network indicates that the measurement gap configuration information in 425 applies to both licensed band cell measurement and unlicensed band cell measurement, the measurement gap of 430 may be used for both licensed band cell measurement and unlicensed band cell measurement. In another example, if the network indicates that the measurement gap configuration information in 425 applies to only licensed band cell measurement, the measurement gap of 430 may be used for licensed band cell measurement. The UE 110 may then perform 5G NR-U cell measurements based on an effective MGRP of (X). For example, X may be equal to 40 milliseconds (ms) or any other appropriate time duration. Since there is no 5G NR-U serving cell, the corresponding RF chain does not need to tune away from a 5G NR-U serving cell. Thus, the UE 110 may attempt to collect measurement data from 5G NR-U cells based on the effective MGRP of (X), however, a measurement gap may not be utilized because there is no tuning away from a serving cell.

Next, consider a scenario in which the UE 110 is currently configured with both one or more licensed band serving cells and one or more 5G NR-U serving cell. If the network indicates that the measurement gap configuration information in 425 applies to both licensed band cell measurement and unlicensed band cell measurement, the measurement gap of 430 may be used for both licensed band cell measurement and unlicensed band cell measurement.

Further, consider a scenario in which the UE 110 is currently configured with one or more 5G NR-U serving cells and there is no currently configured licensed band serving cell. In some embodiments, regardless of whether an explicit legacy measurement gap is configured for licensed band 5G NR cells, a preconfigured effective MGRP may be used for collecting measurement data corresponding to licensed band 5G NR cells. For example, the UE 110 may implement a 20 ms effective MGRP for frequency range 2 (FR2) 5G NR measurements, a 40 ms effective MGRP for frequency range 1 (FR1) 5G NR measurements, a 40 ms effective MGRP for LTE measurements and/or a 40 ms effective MGRP FR1 5G NR measurements and LTE measurements. As indicated above, since there is no licensed band serving cell an actual measurement gap may not be utilized because there is no serving cell to tune away from. Further, reference to 20 ms and 40 ms is merely provided for illustrative purposes, the exemplary embodiments may apply to any appropriate time duration for this effective MGRP.

The following examples describe the behavior of the UE 110 during the measurement gap 430 within the context of the exemplary scenarios of the table 200 when the measurement gap 430 is dedicated for 5G NR-U cell measurement. Within the context of scenario A of the table 200, the UE 110 may not be required to perform reception from or transmission to 5G NR-U serving SCells during the measurement gap dedicated for 5G NR-U except for the reception of signals used for radio resource management measurements and signals used for a random access procedure. In other words, the UE 110 may tune away from 5G NR-U serving SCells for the reception of signals from 5G NR-U neighbor cells during the measurement gap. However, the UE 110 may omit tuning away from or may tune back to 5G NR-U serving SCells during the measurement gap for radio resource management or for a random access procedure corresponding to the 5G NR-U serving SCells.

Within the context of scenario B and E of the table 200, the UE 110 may not be required to perform reception from or transmission to 5G NR-U cells of the SCG (e.g., a primary secondary cell (PSCell), one or more SCells, etc.) during the measurement gap dedicated for 5G NR-U except for the reception of signals used for radio resource management measurements and signals used for a random access procedure. In other words, the UE 110 may tune away from 5G NR-U cells of the SCG for the reception of signals from 5G NR-U neighbor cells during the measurement gap. However, the UE 110 may omit tuning away from or may tune back to 5G NR-U cells of the SCG during the measurement gap for radio resource management or for a random access procedure corresponding to the 5G NR-U cells of the SCG.

Within the context of scenarios C and D of the table 200, the UE 110 may not be required to perform reception from or transmission to 5G NR-U serving cells during the measurement gap dedicated for 5G NR-U except for the reception of signals used for radio resource management measurements and signals used for a random access procedure. In other words, the UE 110 may tune away from 5G NR-U serving cells for the reception of signals from 5G NR-U neighbor cells during the measurement gap. However, the UE 110 may omit tuning away from or may tune back to 5G NR-U serving cells during the measurement gap for radio resource management or for a random access procedure corresponding to the 5G NR-U serving cells.

The following examples describe situations related to 5G NR-U measurement during which interruptions to one of licensed band cells or 5G NR-U cells may occur. Generally, in this context, an interruption may refer to an interruption to the data or control channel connection or an interruption to reference signal transmission/reception.

In a first example, consider a scenario in which the UE 110 does not support an independent measurement gap configuration for 5G NR-U. In this example, interruptions to licensed band serving cells may be caused by UE 110 activities on its 5G NR-U cells such as, but not limited to, 5G NR-U SCell addition, 5G NR-U SCell release, 5G NR-U SCell activation, 5G NR-U SCell deactivation and 5G NR-U bandwidth part (BWP) switching.

In a second example, consider a scenario in which the UE 110 is not configured with an independent measurement gap configuration for 5G NR-U. In this example, interruptions to 5G NR-U serving cells may be caused by UE 110 activities on its licensed band cells such as, but not limited to, 5G NR SCell addition, 5G NR SCell release, 5G NR SCell activation, 5G NR SCell deactivation and 5G NR BWP switching.

In a third example, consider a scenario in which the UE 110 does support an independent measurement gap configuration for 5G NR-U. In this example, interruptions to licensed band serving cells may only be caused by UE 110 activities on its licensed band serving cells such as, but not limited to, 5G NR SCell addition, 5G NR SCell release, 5G NR SCell activation, 5G NR SCell deactivation and 5G NR BWP switching.

In a fourth example, consider a scenario in which the UE 110 does support an independent measurement gap configuration for 5G NR-U. In this example, interruptions to 5G NR-U serving cells may only be caused by UE 110 activities on its 5G NR-U serving cells such as, but not limited to, 5G NR-U SCell addition, 5G NR-U SCell release, 5G NR-U SCell activation, 5G NR-U SCell deactivation and 5G NR-U BWP switching.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a cell of a network:
establishing a connection to a user equipment (UE);
receiving an indication that the UE supports an independent measurement gap configuration for new radio in an unlicensed spectrum (NR-U);
transmitting measurement gap configuration information to the UE, wherein the UE configures a measurement gap pattern based on the measurement gap configuration information; and
receiving a signal from the UE that corresponds to a random access procedure during the measurement gap, wherein the measurement gap is dedicated for NR-U cell measurement and wherein the cell operates in a licensed band.

2. The method of claim 1, wherein the indication is included in an information element (IE) that indicates whether the UE supports an independent measurement gap configuration for licensed band cells and an independent measurement gap configuration for NR-U cells.

3. The method of claim 2, wherein the IE is associated with an advertised band combination.

4. The method of claim 1, wherein the cell indicates that the measurement gap is to be used for i) NR-U cell measurement only, ii) licensed band cell measurement only or iii) both licensed band cell measurement and NR-U cell measurement.

5. The method of claim 1, wherein the cell is a master node for the UE configured with dual connectivity that includes a licensed band cell and NR-U cell and wherein the cell configures the measurement gap for both licensed band cell measurement and NR-U cell measurement.

6. The method of claim 1, wherein the cell is a master node for the UE configured with dual connectivity that includes a licensed band cell and NR-U cell and configures a first measurement gap for licensed band cell measurement and wherein a secondary node configures a second measurement gap for NR-U cell measurement.

7. The method of claim 1, further comprising:
transmitting a signal to the UE that corresponds to radio resource management during the measurement gap, wherein the measurement gap is dedicated for NR-U cell measurement and wherein the cell operates in a licensed band.

8. The method of claim 1, wherein the cell operates in a licensed band, and
wherein the measurement gap configuration information indicates that the measurement gap is to be used for licensed band cell measurement and NR-U cell measurement.

9. A cell, comprising:
a transceiver configured to communicate with a user equipment (UE); and
a processor configured to perform operations, the operations comprising:
establishing a connection to the UE;
receiving an indication that the UE supports an independent measurement gap configuration for new radio in an unlicensed spectrum (NR-U), wherein the indication is included in an information element (IE) that indicates that the UE supports an independent measurement gap configuration for licensed band cells and an independent measurement gap configuration for NR-U cells and wherein the UE supports i) licensed band cell measurement without gaps when the UE is configured with only one or more NR-U serving cells and ii) NR-U cell measurement without gaps when the UE is configured with only one or more licensed band serving cells; and
transmitting measurement gap configuration information to the UE, wherein the UE configures a measurement gap pattern based on the measurement gap configuration information.

10. The cell of claim 9, wherein cell indicates that the measurement gap is to be used for i) NR-U cell measurement only, ii) licensed band cell measurement only or iii) both licensed band cell measurement and NR-U cell measurement.

11. The cell of claim 9, the operations further comprising:
transmitting a signal to the UE that corresponds to radio resource management during the measurement gap, wherein the measurement gap is dedicated for NR-U cell measurement and wherein the cell operates in a licensed band.

12. The cell of claim 9, the operations further comprising:
receiving a signal from the UE that corresponds to a random access procedure during the measurement gap, wherein the measurement gap is dedicated for NR-U cell measurement and wherein the cell operates in a licensed band.

13. The cell of claim 9, wherein the cell operates in a licensed band, and
wherein the measurement gap configuration information indicates that the measurement gap is to be used for licensed band cell measurement and NR-U cell measurement.

14. An integrated circuit for use in a cell, comprising:
circuitry configured to establish a connection to a user equipment (UE);
circuitry configured to receive an indication that the UE supports an independent measurement gap configuration for new radio in the unlicensed spectrum (NR-U), wherein the indication is included in an information element (IE) that indicates that the UE supports an independent measurement gap configuration for licensed band cells and an independent measurement gap configuration for NR-U cells and wherein the UE supports i) licensed band cell measurement without gaps when the UE is configured with only one or more NR-U serving cells and ii) NR-U cell measurement without gaps when the UE is configured with only one or more licensed band serving cells; and
circuitry configured to transmit a measurement gap configuration information to the UE, wherein the UE configures a measurement gap pattern based on the measurement gap configuration information.

15. The integrated circuit of claim 14, wherein cell indicates that the measurement gap is to be used for i) NR-U cell measurement only, ii) licensed band cell measurement only or iii) both licensed band cell measurement and NR-U cell measurement.

16. The integrated circuit of claim 14, further comprising:
circuitry configured to transmit a signal to the UE that corresponds to radio resource management during the measurement gap, wherein the measurement gap is dedicated for NR-U cell measurement and wherein the cell operates in a licensed band.

17. The integrated circuit of claim 14, further comprising:
circuitry configured to receive a signal from the UE that corresponds to a random access procedure during the measurement gap, wherein the measurement gap is dedicated for NR-U cell measurement and wherein the cell operates in a licensed band.

* * * * *